(12) United States Patent
Tani

(10) Patent No.: US 12,145,516 B2
(45) Date of Patent: Nov. 19, 2024

(54) ONBOARD ECU, PROGRAM, AND INFORMATION PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kentaro Tani, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 213 days.

(21) Appl. No.: 17/904,067

(22) PCT Filed: Feb. 4, 2021

(86) PCT No.: PCT/JP2021/004075
§ 371 (c)(1),
(2) Date: Aug. 11, 2022

(87) PCT Pub. No.: WO2021/166658
PCT Pub. Date: Aug. 26, 2021

(65) Prior Publication Data
US 2023/0089480 A1  Mar. 23, 2023

(30) Foreign Application Priority Data

Feb. 20, 2020  (JP) .................................. 2020-027383

(51) Int. Cl.
*B60R 16/023* (2006.01)
*G08B 21/18* (2006.01)

(52) U.S. Cl.
CPC .......... *B60R 16/023* (2013.01); *G08B 21/182* (2013.01)

(58) Field of Classification Search
None
See application file for complete search history.

(56) References Cited

U.S. PATENT DOCUMENTS 5,724,601 A * 3/1998 Kobayashi ........... H03K 5/1254
307/106
2005/0222725 A1  10/2005 Homma et al.
(Continued)

FOREIGN PATENT DOCUMENTS

JP  2011-192231 A  9/2011
JP  2012-132722 A  7/2012
(Continued)

OTHER PUBLICATIONS

International Search Report, Application No. PCT/JP2021/004075, mailed May 11, 2021. ISA/Japan Patent Office.

*Primary Examiner* — Daniel L Greene
(74) *Attorney, Agent, or Firm* — Honigman LLP

(57) ABSTRACT

An onboard ECU communicatively connected to an onboard apparatus installed in a vehicle and a vehicle control apparatus that executes processing relating to driving an onboard apparatus includes a control unit that executes processing relating to control of the onboard apparatus, wherein the control unit acquires an input signal relating to control of the onboard apparatus, derives a count value on the basis of changes in the acquired input signal, outputs a first signal for transitioning the vehicle control apparatus to an activated state in a case where the derived count value reaches a first threshold, and outputs a second signal for requesting the onboard apparatus to be driven in a case where the derived (Continued)

count value reaches a second threshold; and the second threshold is a value greater than the first threshold.

8 Claims, 5 Drawing Sheets

(56) References Cited

U.S. PATENT DOCUMENTS

| | | | | |
|---|---|---|---|---|
| 2011/0291799 | A1* | 12/2011 | Girard, III | H03K 5/1254 340/5.72 |
| 2013/0002135 | A1* | 1/2013 | Kanamori | B60Q 1/08 315/82 |
| 2015/0140995 | A1* | 5/2015 | Kamiya | H04L 67/12 455/420 |
| 2016/0300672 | A1* | 10/2016 | Noguchi | B60R 16/023 |
| 2020/0172053 | A1* | 6/2020 | Lee | E05B 47/00 |

FOREIGN PATENT DOCUMENTS

| | | | | |
|---|---|---|---|---|
| JP | 2017-224926 A | | 12/2017 | |
| KR | 19990083726 A | * | 12/1999 | B60R 16/0315 |
| KR | 101775819 B1 | * | 9/2017 | H01H 9/56 |

* cited by examiner

ONBOARD ECU, PROGRAM, AND INFORMATION PROCESSING METHOD

CROSS-REFERENCE TO RELATED APPLICATIONS

This application is the U.S. national stage of PCT/JP2021/004075 filed on Feb. 4, 2021, which claims priority of Japanese Patent Application No. JP 2020-027383 filed on Feb. 20, 2020, the contents of which are incorporated herein.

TECHNICAL FIELD

The present disclosure relates to an onboard Electronic Control Unit ("ECU"), a program, and an information processing method.

BACKGROUND

Vehicles are installed with body ECUs. Body ECUs are onboard ECUs that perform overall control of body system apparatuses, such as a wiper drive apparatus, a vehicle inside and outside lighting apparatus, a door lock apparatus, power windows, and the like (see JP 2017-224926A, for example). A chattering removal circuit is used in a wiper drive apparatus including the body ECU of JP 2017-224926A, and the chattering removal circuit executes processing to remove chattering included in the input signal produced by operation of a combination switch for selecting the operation mode of the wipers.

The wiper drive apparatus (body ECU) of JP 2017-224926A executes processing to simply remove chattering. Thus, for example, chattering generated by noise is also removed when the wiper drive apparatus is controlled and operated, giving rise to the problem of low control accuracy.

The present disclosure is directed at providing an onboard ECU and the like capable of efficiently handling chattering.

SUMMARY

An onboard ECU according to an aspect of the present disclosure is an onboard ECU communicatively connected to an onboard apparatus installed in a vehicle and a vehicle control apparatus that executes processing relating to driving an onboard apparatus, including a control unit that executes processing relating to control of the onboard apparatus, wherein the control unit acquires an input signal relating to control of the onboard apparatus, derives a count value on the basis of changes in the acquired input signal, outputs a first signal for transitioning the vehicle control apparatus to an activated state in a case where the derived count value reaches a first threshold, and outputs a second signal for requesting the onboard apparatus to be driven in a case where the derived count value reaches a second threshold; and the second threshold is a value greater than the first threshold.

Advantageous Effects of Present Disclosure

According to an aspect of the present disclosure, an onboard ECU and the like capable of efficiently handling chattering can be provided.

DETAILED DESCRIPTION OF PREFERRED EMBODIMENTS

Figure 1:
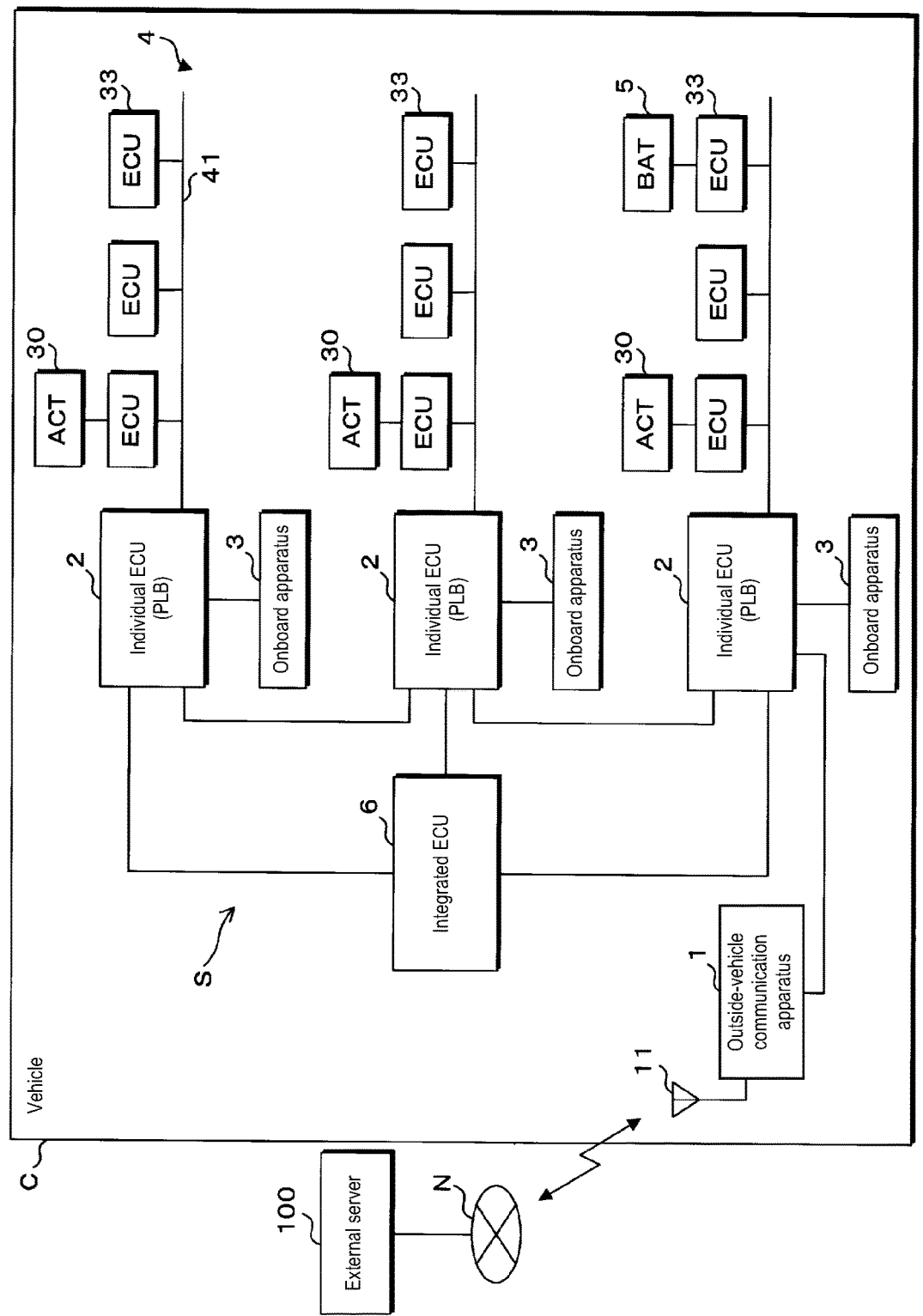
FIG. 1 is a schematic diagram illustrating an example of a system configuration including individual ECUs (onboard ECUs) and an integrated ECU (vehicle control apparatus) according to a first embodiment.

Firstly, embodiments of the present disclosure will be listed and described. One or more parts of the embodiments described below may be combined in a discretionary manner.

First Aspect

An onboard ECU according to a first aspect of the present disclosure is an onboard ECU communicatively connected to an onboard apparatus installed in a vehicle and a vehicle control apparatus that executes processing relating to driving an onboard apparatus, including a control unit that executes processing relating to control of the onboard apparatus, wherein the control unit acquires an input signal relating to control of the onboard apparatus, derives a count value on the basis of changes in the acquired input signal, outputs a first signal for transitioning the vehicle control apparatus to an activated state in a case where the derived count value reaches a first threshold, and outputs a second signal for requesting the onboard apparatus to be driven in a case where the derived count value reaches a second threshold; and the second threshold is a value greater than the first threshold.

According to the first aspect, the control unit counts the number of times a value of the acquired input signal, for example an input signal generated by chattering, changes and derives the number of times as the count value. For example, in a case where the input signal is output from a switch pressed by the operator or the like of the vehicle, the phenomenon (chattering) where the switch switches between on and off in a chattering period determined according to the characteristics of the switch on the basis of the input signal. After the input signal has begun to be acquired, the control unit counts (measures) the number of times the value of the input signal changes due to the switch switching between on and off and derives the count value from the number of times. In a case where the derived count value reaches the first threshold, the control unit outputs, to the vehicle control apparatus, the first signal for transitioning the vehicle control apparatus from a state other than an activated state, such as a standby state or an inactive state, to the activated state. Furthermore, in a case where the derived count value reaches the second threshold, the control unit outputs, to the vehicle control apparatus or another onboard ECU that generates a drive signal for driving the onboard apparatus targeted for control, the second signal for driving the onboard apparatus, such as a request signal for requesting for the onboard apparatus to be driven. When such control is performed, the second threshold is set to a value greater than the first threshold, and in a case where the control unit acquires an input signal, first the control unit outputs the first signal to the vehicle control apparatus, causing the vehicle control apparatus to transition to an activated state. Then, by outputting the second signal, a request for the onboard apparatus to be driven can be sent to the vehicle control apparatus. Accordingly, when driving the onboard apparatus that is targeted for control on the basis of the acquired input signal, even in a case where the vehicle control apparatus that performs drive control is in a standby state, for example, but the count value reaches the first threshold, the first signal is output. This activates the vehicle control apparatus, increasing the responsiveness of the drive control. Also, in a case where the count value reaches the second threshold, the second signal such as a request signal for requesting for the onboard apparatus to be driven is output to the vehicle control apparatus. This reduces the occurrence of the second signal being mistakenly output due to noise or the like and the onboard apparatus targeted for control operating by mistake. By using the onboard ECU configured as such, the responsiveness with respect to the onboard apparatus targeted for control based on the input signal can be improved, and chattering generated by an input signal can be efficiently handled by suppressing the onboard apparatus from operating by mistake.

Second Aspect

In the onboard ECU according to a second aspect of the present disclosure, the control unit decreases the first threshold in a case where the count value reaches the second threshold.

According to the second aspect, the control unit starts acquiring the input signal and decreases the first threshold in a case where the count value derived up until the chattering time (length of time from the occurrence of chattering to when it settles down), which is a predetermined period of time determined on the basis of the characteristics of the switch or the like that outputs the input signal, elapses reaches the second threshold. In a case where the count value reaches the second threshold, the input signal including the chattering of the count value has a high probability of being a normal signal and can be determined that the frequency at which an abnormal signal (erroneous signal) is generated due to noise and the like in the vehicle (host vehicle) is low. Accordingly, in a case where the count value reaches the second threshold, by reducing the first threshold, the first signal can be output at an early stage to the vehicle control apparatus, the vehicle control apparatus can be activated at an early stage, and the responsiveness of the drive control can be improved.

Third Aspect

In the onboard ECU according to a third aspect of the present disclosure, the control unit increases the first threshold in a case where the count value reaches the first threshold but does not reach the second threshold.

According to the third aspect, the control unit starts acquiring the input signal and increases the first threshold in a case where the count value derived up until the chattering time (length of time from the occurrence of chattering to when it settles down), which is a predetermined period of time determined on the basis of the characteristics of the switch or the like that outputs the input signal, elapses does not reach the second threshold after reaching the first threshold. In a case where the count value does not reach the second threshold after reaching the first threshold, in other words, in a case where the control unit starts acquiring the input signal and the count value derived up until the chattering time elapses or until output of the input signal ends is greater than or equal to the first threshold but less than the second threshold, the input signal including the chattering of the count value has a high probability of being an abnormal signal. In other words, it can be determined that the frequency at which an abnormal signal (erroneous signal) is generated due to noise and the like in the vehicle (host vehicle) is high. Thus, in a case where the count value is greater than or equal to the first threshold but less than the second threshold, by increasing the first threshold, for the next input signal, an unnecessary first signal being output can be suppressed. When the vehicle control apparatus is in a state other than the activated state, i.e., a standby state or an inactive state, power consumption by the vehicle control apparatus is reduced. In a case where the count value is greater than or equal to the first threshold but less than the second threshold, the first threshold is increased and an unnecessary output of the first signal can be suppressed, the vehicle control apparatus being transitioned unnecessarily to an activated state can be prevented, and the amount of power consumed by the vehicle control apparatus can be reduced.

Fourth Aspect

In the onboard ECU according to a fourth aspect of the present disclosure, in a case where the first threshold reaches a predetermined maximum value due to being increased by the control unit, the first threshold is fixed at the maximum value and information indicating that the first threshold has reached the maximum value is output.

According to the fourth aspect, in a case where the control unit is greater than or equal to the first threshold but less than the second threshold, the control unit increases the first threshold. In a case where the first threshold reaches the predetermined maximum value, the control unit fixes the first threshold at the maximum value without increasing it further. Also, the control unit outputs information indicating that the first threshold has reached the maximum value to an MHI apparatus such as a display installed in the vehicle or an external server via an external network. In a case where the first threshold reaches the maximum value, it is expected that the frequency at which an abnormal signal is generated due to noise and the like is high or that the switch outputting the input signal is malfunctioning. Here, by fixing the first threshold to the maximum value, the first threshold increasing above the maximum value can be prevented, the difference between the first threshold and the second threshold decreasing can be suppressed, time from when the first signal is output until the second signal is output can be ensured, and assurance of communication with the vehicle control apparatus can be assured.

Fifth Aspect

In the onboard ECU according to a fifth aspect of the present disclosure, the control unit acquires vehicle state information relating to a state of the vehicle and executes initialization processing to reset the first threshold to a predetermined initial value in a case where the vehicle state information satisfies a predetermined condition.

According to the fifth aspect, in a case where the acquired vehicle state information satisfies the predetermined condition, the control unit executes initialization processing to reset the first threshold to the predetermined initial value. With the surrounding environment of the vehicle (host vehicle) or the traveling state of the vehicle (host vehicle) in some cases affecting the occurrence of an abnormal signal due to noise or the like, in a case where the vehicle state information satisfies the predetermined condition, the control unit executes initialization processing and resets the first threshold to the predetermined initial value. In this manner, by executing initialization processing to reset the first threshold to the initial value on the basis of the vehicle state information, the timing of the output of the first signal can be regularly and appropriately set, and stable control can be promoted.

Sixth Aspect

In the onboard ECU according to a sixth aspect of the present disclosure, the vehicle state information includes information relating to a state of charge of an electrical energy storage apparatus installed in the vehicle; and the control unit, in a case where the state of charge of the electrical energy storage apparatus is greater than or equal to a predetermined value, determines that the predetermined condition is satisfied and executes initialization processing to reset the first threshold to a predetermined initial value.

According to the sixth aspect, the control unit acquires the information relating to the state of charge (SOC) of the electrical energy storage apparatus and, in a case where the state of charge is greater than or equal to a predetermined value, determines that the predetermined condition is satisfied and executes initialization processing to reset the first threshold to the predetermined initial value. By the initial value being set to a relatively low value and the first threshold being set to the initial value, the first signal can be output at an early stage to the vehicle control apparatus, the vehicle control apparatus can be activated at an early stage, and the responsiveness of the drive control can be improved. By the vehicle control apparatus being activated, i.e., transitioning to an activated state, the amount of power consumed by the vehicle control apparatus is increased. However, the initialization processing to reset the first threshold to the initial value is executed when the state of charge of the electrical energy storage apparatus is greater than or equal to the predetermined value. Thus, the occurrence of an insufficient state of charge of the electrical energy storage apparatus, i.e., a dead battery, can be efficiently prevented.

Seventh Aspect

A program according to a seventh aspect of the present disclosure includes acquiring an input signal relating to control of an onboard apparatus; deriving a count value on the basis of changes in the acquired input signal; outputting a first signal for transitioning a vehicle control apparatus that executes processing relating to driving the onboard apparatus to an activated state in a case where the derived count value reaches a first threshold; and outputting a second signal for requesting the onboard apparatus to be driven in a case where the derived count value reaches a second threshold greater than the first threshold.

According to the seventh aspect, a computer can be made to function as the onboard ECU that efficiently handles chattering.

Eighth Aspect

An information processing method according to an eighth aspect of the present disclosure includes causing a computer to acquire an input signal relating to control of an onboard apparatus, derive a count value on the basis of changes in a value of the acquired input signal, output a first signal for transitioning a vehicle control apparatus that executes processing relating to driving the onboard apparatus to an activated state in a case where the derived count value reaches a first threshold, and output a second signal for requesting the onboard apparatus to be driven in a case where the derived count value reaches a second threshold greater than the first threshold.

According to the eighth aspect, an information processing method can be provided that causes a computer to function as an onboard ECU that efficiently handles chattering.

The present disclosure will be described in detail below with reference to diagrams of embodiments of the present disclosure. An onboard ECU (individual ECU 2) according to an embodiment of the present disclosure will be described with reference to the following diagrams. Note that the present disclosure is not limited to these examples. The present invention is defined by the scope of the claims, and all modifications that are equivalent to or within the scope of the claims are included.

First Embodiment

Figure 2:
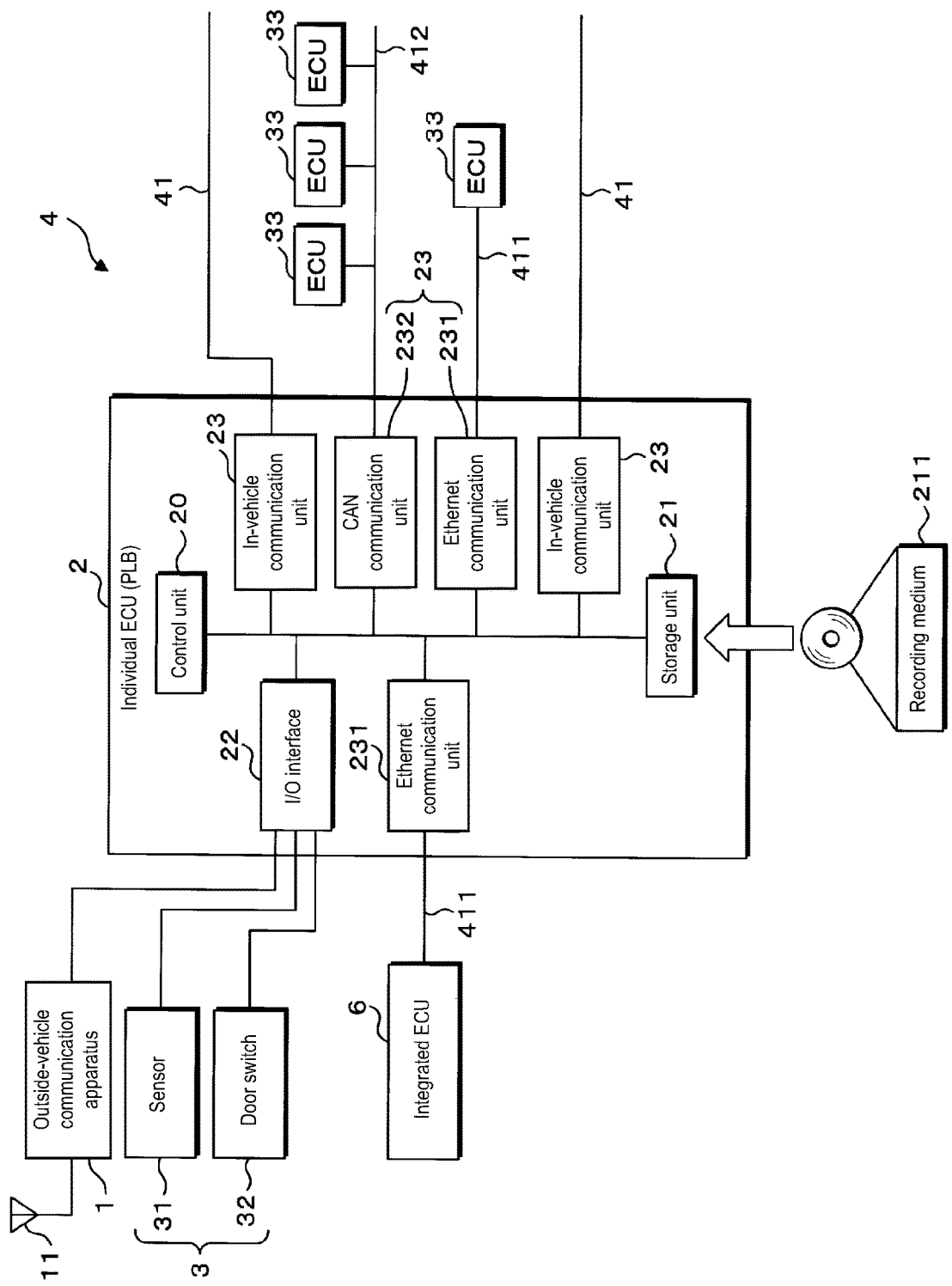
FIG. 2 is a block diagram illustrating an example of an inner configuration of the individual ECU.

An embodiment will be described below with reference to diagrams. FIG. 1 is a schematic diagram illustrating an example of a system configuration including the individual ECUs 2 (onboard ECUs) and an integrated ECU 6 (vehicle control apparatus) according to the first embodiment. FIG. 2 is a block diagram illustrating an example of an inner configuration of the individual ECU 2 (onboard ECU).

An onboard system S includes the plurality of individual ECUs 2 (onboard ECUs) installed in a vehicle, a plurality of onboard apparatuses 3, and the integrated ECU 6 (vehicle control apparatus). The individual ECUs 2 are relay control ECUs disposed in each area of the vehicle, with each one functioning as an onboard relay apparatus, such as a gateway or an Ethernet switch for relaying communications between onboard apparatuses 3 connected to the individual ECU 2 via an onboard network 4 or relaying communications between the onboard apparatus 3 and the integrated ECU 6. The individual ECU 2 may be a Power Lan Box (PLB) that, in addition to relaying communications, may function as a power distribution apparatus that distributes and relays power output from an electrical energy storage apparatus 5 and supplies power to the onboard apparatus 3 connected to the ECU.

The integrated ECU 6 is a central control apparatus such as a vehicle computer that generates and outputs control signals to the individual onboard apparatuses 3 on the basis of data from the onboard apparatuses 3 relayed via the individual ECUs 2. The integrated ECU 6 corresponds to a vehicle control apparatus that executes processing relating to driving an onboard apparatus.

The onboard apparatus 3 includes various sensors 31 such as a Light Detection and Ranging (LiDAR), a light sensor, a CMOS camera, an infrared sensor, and the like; a switch 32 such as a door switch and a lamp switch; an actuator 30 for a lamp, a door open/close apparatus, and the like, a drive ECU 33 directly connected to the actuator 30; and the electrical energy storage apparatus 5. In the present embodiment, the actuator 30 is connected to the drive ECU 33 provided with a communication unit for CAN or the like, but no such limitation is intended. The actuator 30 may include a built-in communication unit for CAN or the like or an I/O interface, and the actuator 30 and the individual ECU 2 may be directly connected and communicate with one another.

An external server 100 is a computer such as a server connected to the outside-vehicle network N, such as the Internet or a public network and is provided with a storage unit constituted by a random access memory (RAM), a read only memory (ROM), a hard disk, or the like. Each individual ECU 2 may be communicatively connected to an outside-vehicle communication apparatus 1, may communicate with the external server 100 connected to the outside-vehicle communication apparatus 1 via an outside-vehicle network N, and may relay communications between the external server 100 and the onboard apparatuses 3 installed in a vehicle C.

The vehicle C is installed with the integrated ECU 6, the outside-vehicle communication apparatus 1, the individual ECU 2, and a plurality of onboard apparatuses 3. The individual ECU 2 and the outside-vehicle communication apparatus 1 are communicatively connected via a wire harness such as a serial cable, for example. The individual ECU 2 and the onboard apparatuses 3 are communicatively connected via a communication line 41 and the onboard network 4 compatible with a communication protocol, such as a control area network (CAN, registered trademark) or Ethernet (registered trademark). The communication protocol of the individual ECU 2 and the onboard apparatuses 3 may be LIN, MOST, FlexRay, or the like. Also, the individual ECU 2 and the onboard apparatuses 3 may be communicatively connected via a wire harness such as a serial cable, for example.

The outside-vehicle communication apparatus 1 includes an outside-vehicle communication unit (not illustrated) and an I/O interface (not illustrated) for communicating with the individual ECU 2. The outside-vehicle communication unit is a communication apparatus for wireless communication using a mobile communication protocol, such as 4G, Long-Term Evolution (LTE, registered trademark), 5G, WiFi, or the like. The outside-vehicle communication unit communicates with the external server 100 via an antenna 11 connected to the outside-vehicle communication unit to transmit and receive data. The communications between the outside-vehicle communication apparatus 1 and the external server 100 are performed via an external network N, such as a public network, the Internet, or the like. The I/O interface is a communication interface for serial communication with the individual ECU 2, for example. The outside-vehicle communication apparatus 1 and the individual ECU 2 communicate with one another via the I/O interface and a wire harness such as a serial cable connected to the I/O interface. In the present embodiment, the outside-vehicle communication apparatus 1 is a separate apparatus from the individual ECU 2 and is communicatively connected thereto via the I/O interface or the like. However, no such limitation is intended. The outside-vehicle communication apparatus 1 may be built-in the individual ECU 2 as a component of the individual ECU 2.

The individual ECU 2 includes a control unit 20, a storage unit 21, an I/O interface 22, and an in-vehicle communication unit 23. The in-vehicle communication unit 23 and the I/O interface 22 correspond to communication units for communicating with the onboard apparatus 3 connected to the individual ECU 2.

Each individual ECU 2, for example, functions as a gateway (relay device) that controls the segments of each system formed by the plurality of communication lines 41 of the onboard apparatus 3 of the recognition system, the onboard apparatus 3 of the determination system, the onboard apparatus 3 of the control system, and the like and that relays communications between the onboard apparatuses 3 between segments. Each communication line 41 corresponds to a bus in each segment (area), and the individual ECU 2 may function as an area control unit that manages the area connected to the ECU. Also, the individual ECU 2 is connected to an electrical energy storage apparatus 5 including a rechargeable battery such as a lithium ion battery and may function as a Power Lan Box (PLB) that distributes power supplied from the electrical energy storage apparatus 5 to the onboard apparatuses 3 included in the segment managed by the ECU. The individual ECU 2 may be (a reprogramming master) configured to acquire, from the outside-vehicle communication apparatus 1, an update program received by the outside-vehicle communication apparatus 1 from the external server 100 via wireless communication and transmit the update program via the onboard network 4 to a predetermined onboard apparatus 3 (update target onboard apparatus 3).

The control unit 20 is constituted by a central processing unit (CPU), a micro processing unit (MPU), or the like and executes various types of control processing and calculation processing by reading out and executing a control program and data stored in advance in the storage unit 21. The control unit 20 is not only limited to a software processing unit that executes software processing such as a CPU and may include a hardware processing unit that executes various types of control processing and calculation processing using FPGA, ASIC, or SOC hardware processing. For example, the control unit 20 may receive an input signal from the switch 32, for example the door switch, connected via the I/O interface 22 via an FPGA hardware processing unit or the like, and the hardware processing unit may activate the software processing unit such as the CPU to execute processing relating to input signal from the switch 32 by the CPU. In this manner, by activating the CPU with the FPGA processing or the like executed using the current or voltage from the input signal from the switch 32 as a trigger, power consumption by the CPU can be reduced.

The storage unit 21 is constituted by a volatile memory element such as random access memory (RAM) or a non-volatile memory element, such as read only memory (ROM), electrically erasable programmable ROM (EE-PROM), flash memory, or the like, and, in the storage unit 21, the control program and data referenced when processing is executed is stored in advance. The control program stored in the storage unit 21 may be a control program read out from a storage medium 211 readable by the individual ECU 2. Also, the control program may be a control program downloaded from a non-illustrated external computer connected to a non-illustrated communication network and stored in the storage unit 21.

Relay path information (routing table) used when executing relay processing for communications between the onboard apparatuses 3, communications between the onboard apparatus 3 and the integrated ECU 6, or communications between the onboard apparatus 3 and the external server 100 is stored in the storage unit 21. The format of the relay path information is determined on the basis of the communication protocol. In a case where the communication protocol is CAN, CAN relay path information includes a message identifier (CAN-ID) included in a CAN message and a relay destination (I/O port number of a CAN communication unit 232) associated with the CAN-ID. In a case where the communication protocol is TCP/IP, TCP/IP relay path information includes a transmission destination address (MAC address or IP address) included in an IP packet and a relay destination (physical port number of an Ethernet communication unit 231) associated with the transmission destination address. The storage unit 21 also stores thresholds (first threshold and second threshold) for a counter value measured on the basis of chattering or the like described below, the initial value of the first threshold, and a predetermined value used when executing initialization processing for the first threshold. The predetermined value used in the initialization processing for the first threshold is a value relating to the state of charge (SOC) of the electrical energy storage apparatus 5, for example.

As with the I/O interface of the outside-vehicle communication apparatus 1, the I/O interface 22 is a communication interface for serial communication, for example. Via the I/O interface 22 and a wire harness such as a serial cable, the individual ECU 2 is communicatively connected to the outside-vehicle communication apparatus 1 and the onboard apparatuses 3, such as the sensor 31, the switch 32, the actuator 30, or the like.

The in-vehicle communication unit 23, for example, is an I/O interface (CAN communication unit 232, Ethernet communication unit 231) using a Control Area Network (CAN) or Ethernet (registered trademark) communication protocol. Also, the control unit 20 communicates with the onboard apparatus 3 connected to the onboard network 4 via the in-vehicle communication unit 23 or another relay apparatus or similar onboard device.

The Ethernet communication unit 231 is an Ethernet PHY unit for a TCP/IP packet transmitted by a 100 BASE-T1 or 1000 BASE-T1 Ethernet cable 411.

The CAN communication unit 232 is a CAN transceiver for a CAN message transmitted on a CAN bus 412 that receives a waveform produced by a potential difference of a differential voltage on the CAN bus 412 constituted by two wires on the high and low side and decodes the received waveform into a signal indicating a bit string of 1s and 0s. Also, the CAN communication unit 232 may include a CAN transceiver and a CAN controller.

A plurality of the in-vehicle communication units 23 (Ethernet communication unit 231, CAN communication unit 232) are provided, and each one of the communication lines 41 (Ethernet cable 411, CAN bus 412) constituting the onboard network 4, i.e., each bus, is connected to one of the in-vehicle communication units 23. By providing a plurality of the in-vehicle communication units 23 in this manner, the onboard network 4 is divided into a plurality of segments, and each segment may connect to the onboard apparatus 3 depending on the function (recognition system function, determination system function, control system function) of the onboard apparatus 3.

The integrated ECU 6 and the plurality of individual ECUs 2 with such a configuration are communicatively connected to a ring network topology as illustrated in FIG. 1, for example. In other words, the integrated ECU 6 and the individual ECU 2 are provided with a plurality of the Ethernet communication units 231, and the ring network topology may be formed with redundancy allowing to communication with both directions. Also, in the ring network topology, the individual ECUs 2 not directly adjacent to the integrated ECU 6 and the integrated ECU 6 may be connected by the communication line 41 via the Ethernet cable 411 or the like forming a bypass line, allowing for further redundancy in the communication path. Furthermore, the integrated ECU 6 and the plurality of individual ECUs 2 may be communicatively connected via a bus network topology formed by the CAN bus 412.

Figure 3:
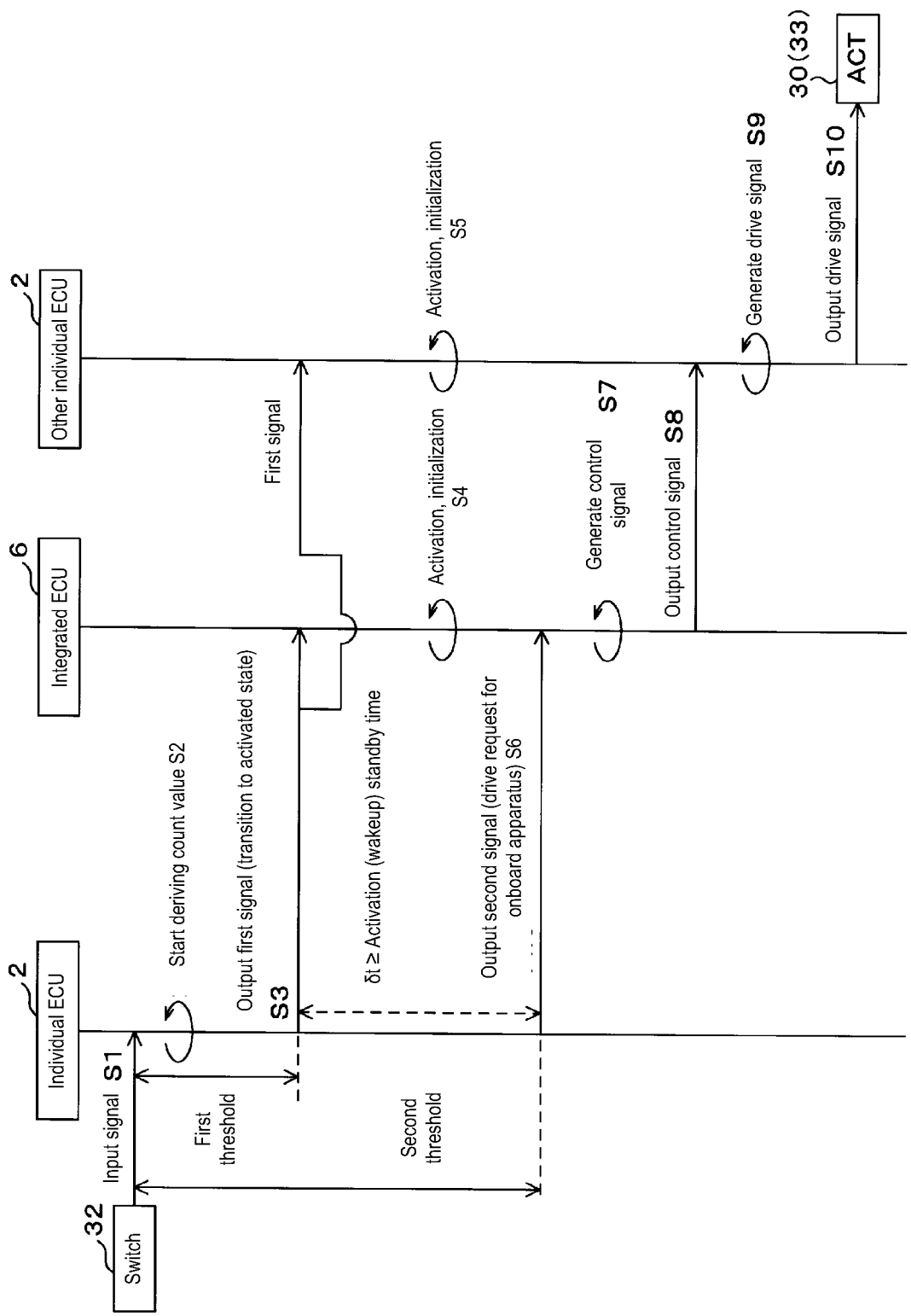
FIG. 3 is an explanatory diagram illustrating an example of the flow (sequence) of the processing by the individual ECU and the integrated ECU.

FIG. 3 is an explanatory diagram illustrating an example of the flow (sequence) of the processing by the individual ECU 2 and the integrated ECU 6. For example, regarding the individual ECU 2 directly connected to the switch 32 such as the door switch, the integrated ECU 6, and the individual ECU 2 (another individual ECU 2) directly connected to the actuator 30 such as a door open/close apparatus, the flow of the processing when the door open/close apparatus operated to open the door switch is described using the sequence diagram.

For example, in a case where the switch 32 such as the door switch provided on the outer surface of the door of the vehicle C is pressed down via an operation by the operator of the vehicle C, an input signal from the door switch is output to the individual ECU 2 directly connected to the door switch (step S1).

The individual ECU 2 starts acquiring (receiving) the input signal output from the door switch, measures the number of times of changes or the number of times of sampling or the like of the input signal (current value or the like) acquired at a predetermined timing on the basis of a value of the change in the input signal caused by chattering, and derives a count value from the measured value (step S2). The count value for handling such chattering may be derived using a gauge determination method or a sampling method, for example. A current may flow due to noise and the like and the individual ECU 2 may start measuring (deriving) a count value due to the noise. The handling processing for this will be described using the flowchart described below.

When continuously measuring (deriving) the count value, in a case where the count value reaches the first threshold, the individual ECU 2 outputs a first signal to the integrated ECU 6 and another individual ECU 2 (step S3). The first signal is an activation signal (return signal) such as a WakeUp signal for transitioning (returning) the integrated ECU 6 and the other individual ECU 2 to an activated state from an inactive state or a standby (sleep) state. In a case where the vehicle C is in the inactive state, i.e., the ignition switch 32 of the vehicle C has been turned off, the integrated ECU 6 and the individual ECU 2 are in the inactive state or the standby (sleep) state, but transition to an activated state by receiving such a WakeUp signal.

The integrated ECU 6 and the other individual ECU 2 that receive the first signal, in transitioning to the activated state, activate the CPU and the like included in the ECU and execute initialization processing and self diagnostic processing as necessary (steps S4 and S5).

The individual ECU 2 continues acquiring (receiving) the input signal output from the door switch and continuously measures (derives) the count value. Then, when the count value reaches the second threshold, the individual ECU 2 outputs a second signal to the integrated ECU 6 (step S6). The second signal is a drive request signal for a drive request for the door open/close apparatus corresponding to the input signal output from the door switch.

In the present embodiment as illustrated, the second threshold is a value greater than the first threshold (second threshold>first threshold), and the second threshold and the first threshold are stored in the storage unit 21 of the individual ECU 2. For example, the first threshold may be 10, and the second threshold may be 100. The first threshold is increased and decreased according to the determination result based on the count value. This is described in detail below. In addition to the first threshold at the current point in time of an increase or decrease, the initial value of the first threshold is also stored in the storage unit 21 of the individual ECU 2.

The second threshold is a value determined according to the length of time from the occurrence of chattering to when it settles down on the basis of the operational specifications or contact point characteristics of the switch 32, for example, and is a value determined on the basis of the chattering duration corresponding to the type and model of each switch 32. The second threshold may be stored in the storage unit 21 of the individual ECU 2 as a fixed value. Alternatively, the second threshold may be a variable value corresponding to a value equaling the sum of the current first threshold and a value corresponding to the activation standby time described below.

The time difference ($\Delta t$) from when the first threshold is reached to when the second threshold is reached is a longer duration than the activation standby time (WakeUp standby time) of the integrated ECU 6 and the individual ECU 2. In other words, the maximum value of the first threshold is set so that, even in a case where the first threshold is increased, the time difference ($\Delta t$) according to the second threshold and the first threshold is a longer duration than the activation standby time (WakeUp standby time). The time difference (Δt) according to the second threshold and the first threshold, for example, is calculated by multiplying the sampling time (sampling period) for measuring the count value by a value obtained by subtracting the first threshold from the second threshold.

The activation standby time (WakeUp standby time) is the amount of time taken from when the integrated ECU 6 and the individual ECU 2 start activating until completion and is an amount of time determined on the basis of the specifications or characteristics of the CPU and the like included in the integrated ECU 6 and the individual ECU 2. In other words, the maximum value of the first threshold is set with respect to the second threshold so that the elapsed time from the output time of the first signal until the output time of the second signal is a longer duration than the activation standby time (WakeUp standby time). By making the time difference (Δt) a longer duration than the activation standby time in this manner, the second signal being transmitted to the integrated ECU 6 and the like can be prevented before the integrated ECU 6 and the other individual ECU 2 transitions to the activated state (before returning) and assurance of communication with the integrated ECU 6 and the individual ECU 2 can be assured.

The integrated ECU 6 that received the second signal generates a control signal for controlling the actuator 30 (door open/close apparatus) corresponding to the second signal (step S7) and outputs the control signal to the individual ECU 2 (other individual ECU 2) directly connected to the actuator 30 (door open/close apparatus) (step S8). In a case where, when generating and outputting the control signal, drive requests for the same actuator 30 or associated actuators 30 overlap or conflict, the integrated ECU 6 may perform mediation for the plurality of drive requests and may generate and output a control signal.

The individual ECU 2 (other individual ECU 2) that received the control signal from the integrated ECU 6 generates a drive signal, such as a pulse signal, a duty or on signal, for driving the actuator 30 (door open/close apparatus) (step S9) and outputs the drive signal to the actuator 30 (door open/close apparatus) (step S10). The actuator 30 (door open/close apparatus) performs driving on the basis of the drive signal to open the door or the door key, for example.

In the present embodiment, the switch 32 and the actuator 30 that performs driving on the basis of the signal from the switch 32 are used as examples of the door switch and the door open/close apparatus, but no such limitation is intended. The switch 32 and the actuator 30 that performs driving on the basis of the signal from the switch 32 may be an indoor lamp switch and an indoor lamp, for example.

The individual ECU 2 performs, in two stages, determination relating to the control of the switch 32 such as the door switch that outputs an input signal using the two values, the first threshold and the second threshold, as the number of times of digital filtering for chattering measures. The individual ECU 2 outputs the first signal for activation processing of the integrated ECU 6 and the other individual ECU 2 in response to an initial determination (determination in the first stage) based on the first threshold. After the output of the first signal, the individual ECU 2 outputs the second signal for requesting driving of the actuator 30 in accordance with the second determination (second determination stage) based on the second threshold.

For example, even in a case where a current flows due to noise or the like, if the count value derived by the individual ECU 2 does not reach the first threshold, the individual ECU 2 does not output the first signal to the integrated ECU 6. This means that the standby state of the integrated ECU 6 and the like is maintained. This reduces unnecessary power consumption by the integrated ECU 6 and the like.

Also, in a case where the count value derived by the individual ECU 2 reaches the first threshold but doesn't reach the second threshold, the individual ECU 2 does not output the second signal to the integrated ECU 6, meaning that the actuator 30 is not driven. This reduces unnecessary power consumption by the actuator 30.

In a case where a regular input signal from the switch 32 such as the door switch is output, the count value derived by the individual ECU 2 reaches the first threshold and the second threshold. This, the integrated ECU 6 and the other individual ECU 2 can be activated (returned), and the actuator 30 such as the door open/close apparatus corresponding to the input signal can be reliably driven by the control signal and drive signal generated and output by the integrated ECU 6 and the other individual ECU 2.

At the point in time when the count value reaches the first threshold, the individual ECU 2 outputs the first signal to the integrated ECU 6 and the other individual ECU 2, allowing the integrated ECU 6 and the other individual ECU 2 to be transitioned to the activated state at an early stage. Thus, at the point in time when the second threshold is reached, the first signal is output, allowing the actuator 30 to be driven at an earlier stage than in the case of outputting the second signal after the WakeUp standby time described above has elapsed since the point in the time when the first signal is output. Thus, the responsiveness (response) of the actuator 30 such as the door open/close apparatus with respect to the switch 32 such as the door switch can be improved. In other words, even in a case where the responsiveness is improved and an erroneous signal is input due to noise or the like, if the count value doesn't reach the second threshold, driving of the actuator 30 is prevented, allowing unnecessary power consumption to be reduced.

Figure 4:
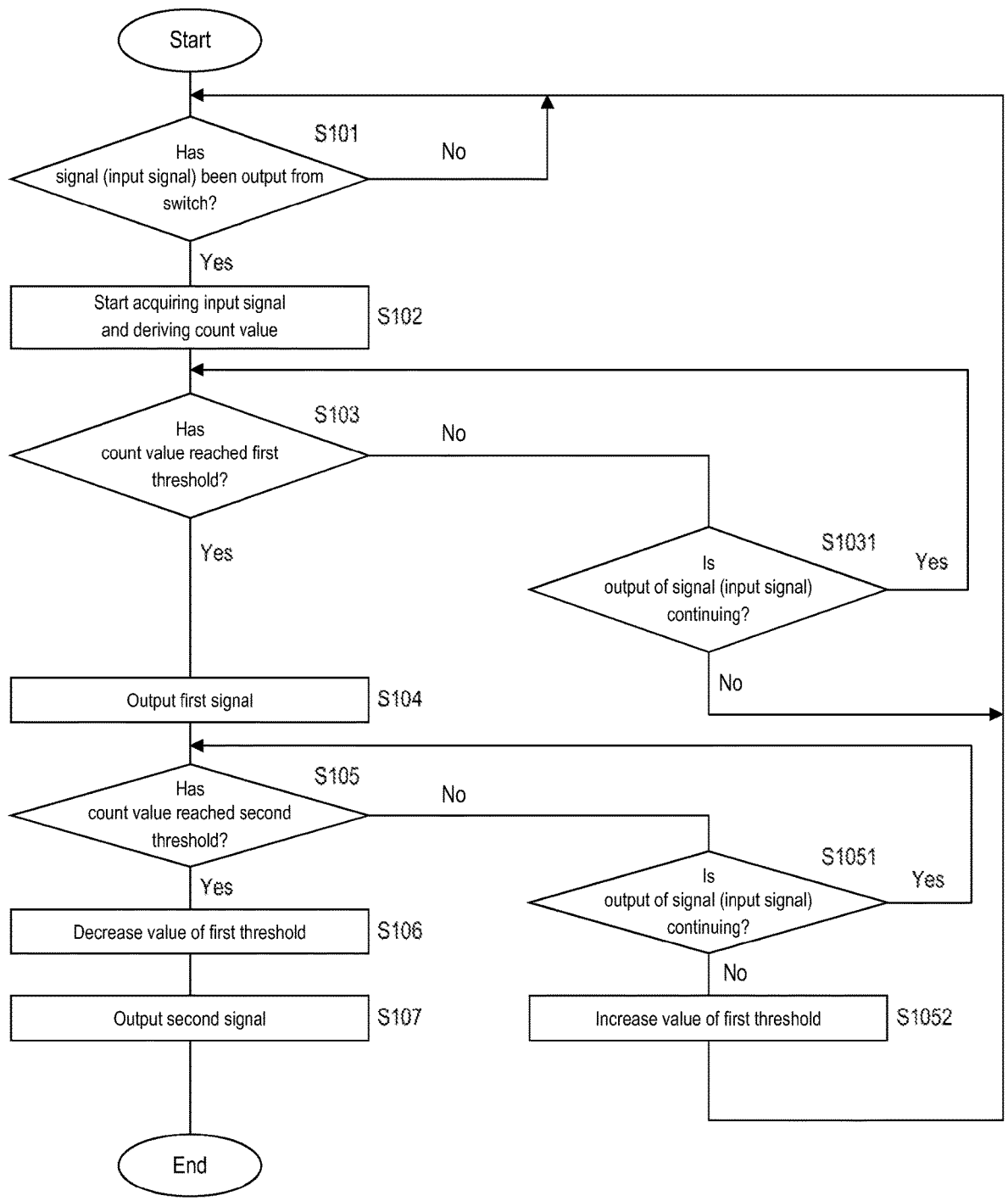
FIG. 4 is a flowchart illustrating an example of the processing of the control unit of the individual ECU.

FIG. 4 is a flowchart illustrating an example of the processing of the control unit 20 of the individual ECU 2. The control unit 20 of the individual ECU 2 regularly executes the following processing when the vehicle C is in an activated state (the ignition switch is on) or in an inactive state (the ignition switch is off).

The control unit 20 of the individual ECU 2 determines whether or not a signal (input signal) has been output from the switch 32 (step S101). The control unit 20 determines whether or not a signal (input signal) has been output from the switch 32 such as the door switch, for example. For example, the control unit 20 monitors current, signal, and pulse flowing through the harness connected with the switch 32 such as the door switch or the voltage and duty applied via the harness and, in a case where a predetermined current value, voltage value, or signal waveform is detected, determines that a signal (input signal) has been output from the switch 32.

In a case where a signal (input signal) has not been output from the switch 32 (no in step S101), the control unit 20 of the individual ECU 2 executes loop processing so that the processing of step S101 is executed again. In other words, the control unit 20 of the individual ECU 2 continues monitoring the state of the switch 32.

In a case where a signal (input signal) has been output from the switch 32 (yes in step S101), the control unit 20 of the individual ECU 2 starts acquiring the input signal and deriving the count value (step S102). In a case where a signal (input signal) has been output from the switch 32, the control unit 20 of the individual ECU 2 starts acquiring the input signal. Furthermore, using the input signal for which acquisition has started, the control unit 20 starts measuring (deriving) the count value by measuring the number of times on is indicated by the switch 32 including the input signal on the basis of a predetermined sampling timing. For example, the initial value of the count value may be set to 0, and the control unit 20 of the individual ECU 2 may execute increment processing by increasing the count value by one in accordance with a number of times on is detected being indicated on the basis of the sampling timing or each time chattering occurs.

The control unit 20 of the individual ECU 2 determines whether or not the measured count value has reached the first threshold (step S103). In a case where the count value has not reached the first threshold (no in step S103), the control unit 20 of the individual ECU 2 determines whether or not to continue outputting the signal (input signal) from the switch 32 (step S1031). The control unit 20 of the individual ECU 2, for example, determines whether or not to continue outputting the signal (input signal) from the switch 32 on the basis of the current or voltage of the wire harness connecting the switch 32 and the ECU.

In a case where the output of the signal (input signal) from the switch 32 is continued (yes in step S1031), the control unit 20 of the individual ECU 2 executes loop processing so that the processing of step S103 is executed again. In other words, the control unit 20 continuously measures (derives) the count value while the signal (input signal) is being output from the switch 32.

In a case where the output of the signal (input signal) from the switch 32 is not continued (no in step S1031), in other words, signal output has ended, the control unit 20 of the individual ECU 2 executes loop processing so that the processing of step S101 is executed again. In other words, the control unit 20 determines that the input signal acquired this time is not a regular signal output from the switch 32 but an erroneous signal generated by noise, for example, and executes processing to monitor the switch 32 to determine whether or not there is an input signal output again from the switch 32. When loop processing is executed to execute step S101, the control unit 20 of the individual ECU 2 executes processing to reset the count value increased by increment processing back to the initial value of 0.

Because the signal with a count value that ended without reaching the first threshold is an erroneous signal generated by noise of the like, the first threshold is used as a first time of digital filtering. In this manner, unnecessary processing by the integrated ECU 6 and the onboard apparatus 3 and unnecessary power use by the integrated ECU 6 and the onboard apparatus 3 caused by an erroneous signal can be reduced.

In a case where the count value has reached the first threshold (yes in step S103), the control unit 20 of the individual ECU 2 outputs the first signal (step S104). In a case where the count value has reached the first threshold, the control unit 20 of the individual ECU 2 outputs the first signal to the integrated ECU and the other individual ECU 2 for transitioning these integrated ECUs to the activated state. The integrated ECU and the other individual ECU 2 that have received the first signal transition (return) from an inactive state or a standby state to the activated state.

The control unit 20 of the individual ECU 2 determines whether or not the count value has reached the second threshold (step S105). In a case where the count value has not reached the second threshold (no in step S105), as in step S1031 the control unit 20 of the individual ECU 2 determines whether or not to continue outputting the signal (input signal) from the switch 32 (step S1051).

In a case where the output of the signal (input signal) from the switch 32 is continued (yes in step S1051), the control unit 20 of the individual ECU 2 executes loop processing so that the processing of step S105 is executed again. In other words, the control unit 20 continuously measures (derives) the count value while the signal (input signal) is being output from the switch 32.

In a case where the output of the signal (input signal) from the switch 32 is not continued (no in step S1051), in other words, signal output has ended, the control unit 20 of the individual ECU 2 increases the value of the first threshold (step S1052). The control unit 20 determines that the input signal acquired this time is not a regular signal output from the switch 32 but an erroneous signal generated by noise, for example, and executes processing to increase the value of the first threshold by a predetermined number such as 1. After step S1052, the control unit 20 of the individual ECU 2 executes loop processing so that the processing of step S101 is executed again.

Because the signal with a count value that ended reaching the first threshold but not reaching the second threshold is an erroneous signal generated by noise of the like, the second threshold is used as a second time of digital filtering. In this manner, unnecessary processing by the onboard apparatus 3 and unnecessary power use by the onboard apparatus 3 caused by an erroneous signal can be reduced.

In a case where, though the count value reached the first threshold, the count value does not reach the second threshold, the amount of time a current flows due to the noise is long and relatively many instances of chattering may occur. Thus, even in a case where the control unit 20 of the individual ECU 2 increases the value of the first threshold causing an erroneous signal to be input next due to noise or the like, because the output time of the first signal for activating the integrated ECU 6 and the like is delayed, unnecessary activation of the integrated ECU 6 and the like due to an erroneous signal can be prevented, allowing an increase in power consumption to be suppressed.

In a case where the count value has reached the second threshold (yes in step S105), the control unit 20 of the individual ECU 2 decreases the first threshold (step S106) and outputs the second signal (step S107). In the present embodiment, after the value of the first threshold is decreased, the second signal is output, but no such limitation is intended. The control unit 20 of the individual ECU 2 may decrease the value of the first threshold after outputting the second signal. Alternatively, the control unit 20 of the individual ECU 2 may execute a subprocess and execute decreasing the value of the first threshold and outputting the second signal in parallel.

In a case where the count value reaches both the first threshold and the second threshold, the control unit 20 of the individual ECU 2 determines that the acquired input signal is a regular signal output from the switch 32 and executes processing to decrease the first threshold by a predetermined number such as 1. In a case where the count value reaches the second threshold, there is a high probability that the vehicle C is in an operating environment conducive to a low frequency of erroneous signals caused by noise and the like. Thus, by decreasing the first threshold, regarding the next input signal, the first signal can be output to the integrated ECU 6 and the like at an early stage to activate the integrated ECU 6 and the like, and the responsiveness to the actuator 30 corresponding to the switch 32 that outputs an input signal can be improved.

The integrated ECU 6 that acquired (received) that second signal output by the control unit 20 of the individual ECU 2 outputs a control signal to the other individual ECU 2 directly connected to the actuator 30 corresponding to the switch 32 that output the input signal. The other individual ECU 2 drives the actuator 30 by generating and outputting a drive signal for driving the actuator 30 on the basis of the control signal from the integrated ECU 6.

The control unit 20 of the individual ECU 2 may directly output the generated second signal to the other individual ECU 2 directly connected to the actuator 30 corresponding to the switch 32 that output the input signal. The other individual ECU 2 that acquired (received) the second signal may drive the actuator 30 by generating and outputting a drive signal on the basis of the second signal.

In the present embodiment, the control unit 20 of the individual ECU 2 increases the first threshold in the processing of step S1052, but no such limitation is intended. Even in a case where the processing of step S1052 should be executed, in other words in a case where the output of the signal (input signal) from the switch 32 is not continuing (no in step S1051), the control unit 20 of the individual ECU 2 may fix the first threshold without increasing it in a case where the current value of the first threshold is equal to a predetermined maximum value or greater than the maximum value due to the current first threshold being increased.

The maximum value of the first threshold is a value determined, in relation to the second threshold, so that the activation standby time (WakeUp standby time) is ensured. Alternatively, the maximum value of the first threshold may be determined in terms of a percentage of the second threshold such as 80% of the second threshold or the like.

In a case where the first threshold is fixed due to the current value of the first threshold reaching the maximum value, the control unit 20 of the individual ECU 2 may determine that the vehicle C is in an operating environment conducive to a high frequency of erroneous signals caused by noise and may output information relating to the determination to the external server 100 via an HMI apparatus such as a display or the outside-vehicle communication apparatus 1. By outputting (transmitting) information relating to the determination to an HMI apparatus or the external server 100, the operator or the like of the vehicle C can be notified that the vehicle C is in an operating environment conducive to a high frequency of erroneous signals caused by noise.

Second Embodiment

Figure 5:
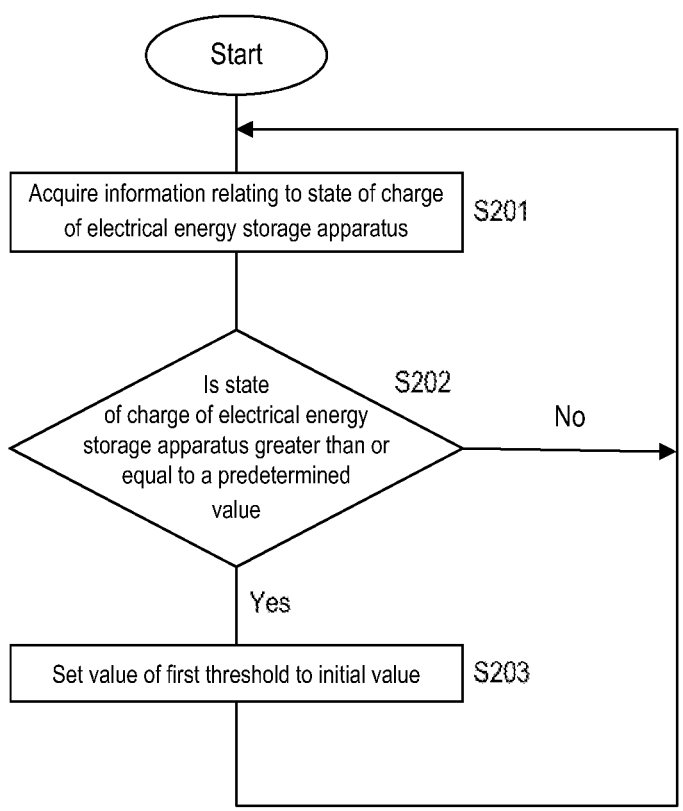
FIG. 5 is a flowchart illustrating an example of the processing of the control unit of the individual ECU according to a second embodiment (initialization of the first threshold).

FIG. 5 is a flowchart illustrating an example of the processing of the control unit 20 of the individual ECU 2 according to the second embodiment (initialization of the first threshold). The control unit 20 of the individual ECU 2 regularly executes the following processing when the vehicle C is in an activated state (the ignition switch is on) or in an inactive state (the ignition switch is off).

When the control unit 20 of the individual ECU 2 executes the series of processing of the present embodiment, the series of processing may be executed in a case where a signal (input signal) is not being output from the switch 32. In other words, as in the processing of step S101 of the first embodiment, in a case where the control unit 20 determines whether or not that the signal (input signal) from the switch 32 has been output and finds that the signal (input signal) has not been output from the switch 32, processing relating to initialization of the first threshold may be executed.

The control unit 20 of the individual ECU 2 acquires information relating to the state of charge of the electrical energy storage apparatus 5 (step S201). The control unit 20 acquires the information relating to the state of charge (SOC) of the electrical energy storage apparatus 5 by communicating with the electrical energy storage apparatus 5 or the drive ECU or the like connected to the electrical energy storage apparatus 5. Alternatively, by detecting the voltage of the power line connecting the ECU and the electrical energy storage apparatus 5, the control unit 20 of the individual ECU 2 may acquire the information relating to the state of charge of the electrical energy storage apparatus 5.

The control unit 20 of the individual ECU 2 determines whether or not the state of charge of the electrical energy storage apparatus 5 is greater than or equal to a predetermined value (step S202). For example, the control unit 20 determines whether or not the state of charge of the electrical energy storage apparatus 5 is greater than or equal to the predetermined value using the full charge of the electrical energy storage apparatus 5, for example using 85% of the full charge as the predetermined value.

In a case where the state of charge is greater than or equal to the predetermined value (yes in step S202), the control unit 20 of the individual ECU 2 sets the value of the first threshold to the initial value (step S203). The initial value of the first threshold is stored in the storage unit 21, and, in a case where the state of charge is greater than or equal to the predetermined value, the control unit 20 sets the current value of the first threshold to the initial value. After step S203, the control unit 20 executes loop processing so that the processing of step S201 is executed again.

Even in a case where the current value of the first threshold is greater than the initial value, for example, the initialization processing to reset the first threshold to the initial value is executed when the state of charge of the electrical energy storage apparatus 5 is greater than or equal to the predetermined value. Thus, the occurrence of an insufficient state of charge of the electrical energy storage apparatus 5, i.e., a dead battery, can be efficiently prevented.

In a case where the state of charge is not greater than or equal to the predetermined value (no in step S202), loop processing is executed so that the processing of the step S201 is executed again. In a case where the state of charge is not greater than or equal to the predetermined value, the control unit 20 maintains the current value of the first threshold without change and executes loop processing so that the processing of step S201 is executed again.

As described above, with the first threshold being increased or decreased via processing based on the count value, it is expected that erroneous signals due to noise and the like caused by the increase or decrease are affected by the operating environment of the vehicle C (host vehicle). Thus, in a case where the vehicle state information such as the state of charge of the electrical energy storage apparatus 5 satisfies a predetermined condition, for example, initialization processing is executed and the first threshold is reset to the predetermined initial value. This allows the output timing of the first signal to be regularly and appropriately set and allows control to be stabilized. By using the predetermined condition in the determination on the basis of the state of charge of the electrical energy storage apparatus 5, the responsiveness of the actuator 30 can be improved and occurrences of an insufficient state of charge of the electrical energy storage apparatus 5 and the like can be efficiently prevented.

The embodiments disclosed herein are examples in all respects and should not be interpreted as limiting in any manner. The scope of the present invention is defined not by the foregoing description, but by the scope of the claims, and all modifications that are equivalent to or within the scope of the claims are included.

The invention claimed is:

1. An onboard Electronic Control Unit ("ECU") communicatively connected to an onboard apparatus installed in a vehicle and a vehicle control apparatus that executes processing relating to driving an onboard apparatus, comprising:
a control unit that executes processing relating to control of the onboard apparatus, wherein the control unit:
acquires an input signal relating to control of the onboard apparatus,
derives a count value on the basis of the number of times the acquired input signal is turned on and off,
outputs a first signal for transitioning the vehicle control apparatus to an activated state in a case where the derived count value reaches a first threshold, and
outputs a second signal for requesting the onboard apparatus to be driven in a case where the derived count value reaches a second threshold; and
the second threshold is a value greater than the first threshold.

2. The onboard ECU according to claim 1, wherein the control unit decreases the first threshold in a case where the count value reaches the second threshold.

3. The onboard ECU according to claim 1, wherein the control unit increases the first threshold in a case where the count value reaches the first threshold but does not reach the second threshold.

4. The onboard ECU according to claim 3, wherein in a case where the first threshold reaches a predetermined maximum value due to being increased by the control unit, the first threshold is fixed at the maximum value and information indicating that the first threshold has reached the maximum value is output.

5. The onboard ECU according to claim 1, wherein the control unit acquires vehicle state information relating to a state of the vehicle and executes initialization processing to reset the first threshold to a predetermined initial value in a case where the vehicle state information satisfies a predetermined condition.

6. The onboard ECU according to claim 5, wherein the vehicle state information includes information relating to a state of charge of an electrical energy storage apparatus installed in the vehicle; and
the control unit, in a case where the state of charge of the electrical energy storage apparatus is greater than or equal to a predetermined value, determines that the predetermined condition is satisfied and executes initialization processing to reset the first threshold to a predetermined initial value.

7. A computer program product comprising a non-transitory, machine-readable medium storing instructions which, when executed by at least one programmable processor, causes at least one programmable processor to perform operations comprising:
acquiring an input signal relating to control of an onboard apparatus;
deriving a count value on the basis of the number of times the acquired input signal is turned on and off;
outputting a first signal for transitioning a vehicle control apparatus that executes processing relating to driving the onboard apparatus to an activated state in a case where the derived count value reaches a first threshold; and
outputting a second signal for requesting the onboard apparatus to be driven in a case where the derived count value reaches a second threshold greater than the first threshold.

8. An information processing method, comprising:
causing a computer to execute processing including
acquiring an input signal relating to control of an onboard apparatus,
deriving a count value on the basis of the number of times the acquired input signal is turned on and,
outputting a first signal for transitioning a vehicle control apparatus that executes processing relating to driving the onboard apparatus to an activated state in a case where the derived count value reaches a first threshold, and
outputting a second signal for requesting the onboard apparatus to be driven in a case where the derived count value reaches a second threshold greater than the first threshold.

* * * * *